US012238589B2

(12) United States Patent
Zopf et al.

(10) Patent No.: US 12,238,589 B2
(45) Date of Patent: Feb. 25, 2025

(54) ADAPTIVE WIRELESS CONNECTIONS IN MULTI-MODE DEVICES

(71) Applicant: Cypress Semiconductor Corporation, San Jose, CA (US)

(72) Inventors: Robert Zopf, Rancho Santa Margarita, CA (US); Yanbing Zhang, Basking Ridge, NJ (US); Yan Li, Morganville, NJ (US); Hongwei Kong, Basking Ridge, NJ (US); Kamesh Medapalli, San Jose, NJ (US); James Wihardja, Tustin, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 529 days.

(21) Appl. No.: 17/538,328

(22) Filed: Nov. 30, 2021

(65) Prior Publication Data

US 2023/0171649 A1   Jun. 1, 2023

(51) Int. Cl.
*H04W 36/00* (2009.01)
*H04W 36/30* (2009.01)
*H04W 4/80* (2018.01)
*H04W 88/06* (2009.01)

(52) U.S. Cl.
CPC ... *H04W 36/0027* (2013.01); *H04W 36/0085* (2018.08); *H04W 36/03* (2018.08); *H04W 36/302* (2023.05); *H04W 4/80* (2018.02); *H04W 88/06* (2013.01)

(58) Field of Classification Search
CPC ......... H04W 36/0027; H04W 36/0085; H04W 36/03; H04W 36/30; H04W 4/80; H04W 88/06; H04W 84/18; H04W 24/02; H04W 76/10; H04L 41/0816; H04L 41/147; H04L 43/08; H04L 69/321
See application file for complete search history.

(56) References Cited

U.S. PATENT DOCUMENTS 11,006,315 B2 *  5/2021  Bhooma ............... H04W 24/08
2022/0330062 A1 * 10/2022  Zaphir ................. H04W 24/08

OTHER PUBLICATIONS

AdaptaBLE: Data Rate and Transmission Power Adaptation for Bluetooth Low Energy; 2019 IEEE Global Communications Conference (GLOBECOM); Dec. 9-13, 2019 (Year: 2019).*

* cited by examiner

*Primary Examiner* — Chi H Pham
*Assistant Examiner* — Samuel Dilan Rutnam (57) ABSTRACT

Implementations disclosed describe techniques and systems that improve wireless connectivity between devices that support multiple operation modes, by monitoring a quality of the established wireless connection and performing a change of the operation mode in response to changing conditions. The disclosed techniques include obtaining metrics characterizing quality of the wireless connection, identifying a utility function that is specific to an application supported by the wireless connection, computing multiple values of the utility function for various operation modes, based on the obtained metrics, and initiating a change of the operation mode based on a comparison of the computed utility values.

20 Claims, 7 Drawing Sheets

ADAPTIVE WIRELESS CONNECTIONS IN MULTI-MODE DEVICES

TECHNICAL FIELD

The disclosure pertains to wireless networks; more specifically, to dynamic optimization of wireless connections between network devices that are capable of supporting multiple operation modes. Disclosed techniques include monitoring physical and digital characteristics of a wireless link, evaluating link quality for different operation modes, and making a dynamic selection of an operation mode in view of an application that uses the wireless link.

BACKGROUND

Personal area networks, such as Bluetooth® (BT), Zigbee®, Thread®, etc., networks provide wireless connection for various personal industrial, scientific, and medical applications. For example, BT networks use a packet-based protocol and have an architecture that includes central devices (CDs) that can communicate with multiple peripheral devices (PDs). Bluetooth Low Energy (BLE) networks have communication ranges that are similar to that of BT networks but have a considerably smaller power consumption and cost. BLE devices often remain in a sleep mode and transition to an active mode when data communication is about to happen. BLE specification supports a number of physical (PHY) layers capable of facilitating different maximum transmission rates. In 1 Mbps and 2 Mbps operation modes, each bit is represented by one transmitted symbol; in a 2 Mbps operation mode the number of transmitted symbols per second is doubled. In a LE Coded S=2 (or S=8) mode, the symbol transmission rate is 1 Mbps but each bit is coded using two (or eight) symbols with the bit transmission rate reduced to 500 kbps (or 125 kbps). Coded modes have lower throughput but longer operating ranges than the 1 Mbps or 2 Mbps modes. In some instances, the higher bit rate modes can be more energy-efficient (per unit of communicated information), provided that the link quality is high, but can become less efficient if the link quality deteriorates (e.g., due to noise and/or interference from other devices) so that multiple attempts to retransmit the same data are required.

DETAILED DESCRIPTION

Wireless BLE devices (or any other personal area network devices) often provide a wireless connectivity to a host device. For example, a desktop computer (a first host) may be using its BLE wireless device to stream audio (or video) files to a smartphone (a second host) that deploys another BLE wireless device. Each wireless device may include antennas (e.g., 2.4 GHz antennas), radio components, PHY and link layers, a protocol stack, a memory, and a processing device (e.g., central processing unit or a microcontroller) and may transform digital data packets used by the host into radio signals that can be communicated to other BLE devices over air. When the wireless connection (also sometimes referred herein as a link) is first established, one of the hosts may select an operation mode (OM) from multiple available OMs. The host may select one of the high transmission bitrate OMs (e.g., the 1 Mbps or 2 Mbps mode). During subsequent communications, the quality of the established wireless link may change, e.g., degrade, due to changed mutual locations of the two wireless devices, intervening physical barriers, signal interference from other connected devices, multiple reflections of radio waves, as well as other changing environmental conditions. The host, however, may not be cognizant of the changing conditions. The information about the quality of the wireless link, such as throughput, packet latency, packet loss, and the like, may be available to the wireless controller (e.g., of the BLE wireless device), but the wireless controller may not be configured to provide such information to the host or to make use of the information to improve the quality of the wireless link. As a result, changing conditions may lead to degraded performance of the applications supported by the wireless devices, loss of information, repeated retransmission of the same data, diminished user experience and satisfaction, and other negative consequences.

Aspects and implementations of the present disclosure address these and other limitations of the existing technology by enabling systems and methods of dynamic selection and switching of operation modes based on detected and inferred metrics characterizing the state of the environment (e.g., signal strength, signal-to-noise ratio, etc.) and the state of the wireless connection (e.g., throughput, latency, bit error rate, etc.). The wireless controller may collect various such metrics and evaluate the quality of the wireless link in the current operation mode as well as projected quality of various other operation modes, if the mode is changed. The wireless controller may perform such evaluation in view of a specific application (or multiple applications) that is being executed on a host device (e.g., an audio application, a video application, a data monitoring application, and so on). Some applications may prioritize achieving the highest possible throughput while other applications may function better with a reduced throughput but with reduced latency. Accordingly, the wireless controller may select a procedure for maximizing an application-specific wireless link quality, also referred to herein as utility. The wireless controller may evaluate the utility of the wireless link in various operation modes, including the current operation mode and at least some of other modes available for data transmission and reception. If a determination is made that the utility of the current mode is inferior to the utility of some other mode(s), the wireless controller may initiate a change of the operation mode without involving the host device. In some implementations, the wireless controller may provide a recommendation to the host device to change the operation mode and the host device may initiate the change. In some implementations, the wireless controller may provide the collected metrics to the host device and the host device may perform the utility evaluation and determination of the optimal mode for subsequent communications. In some implementations, evaluation of the wireless link and/or initiation of the change of the operation mode may be performed by the host device. Numerous other implementations are described below.

Figure 1:
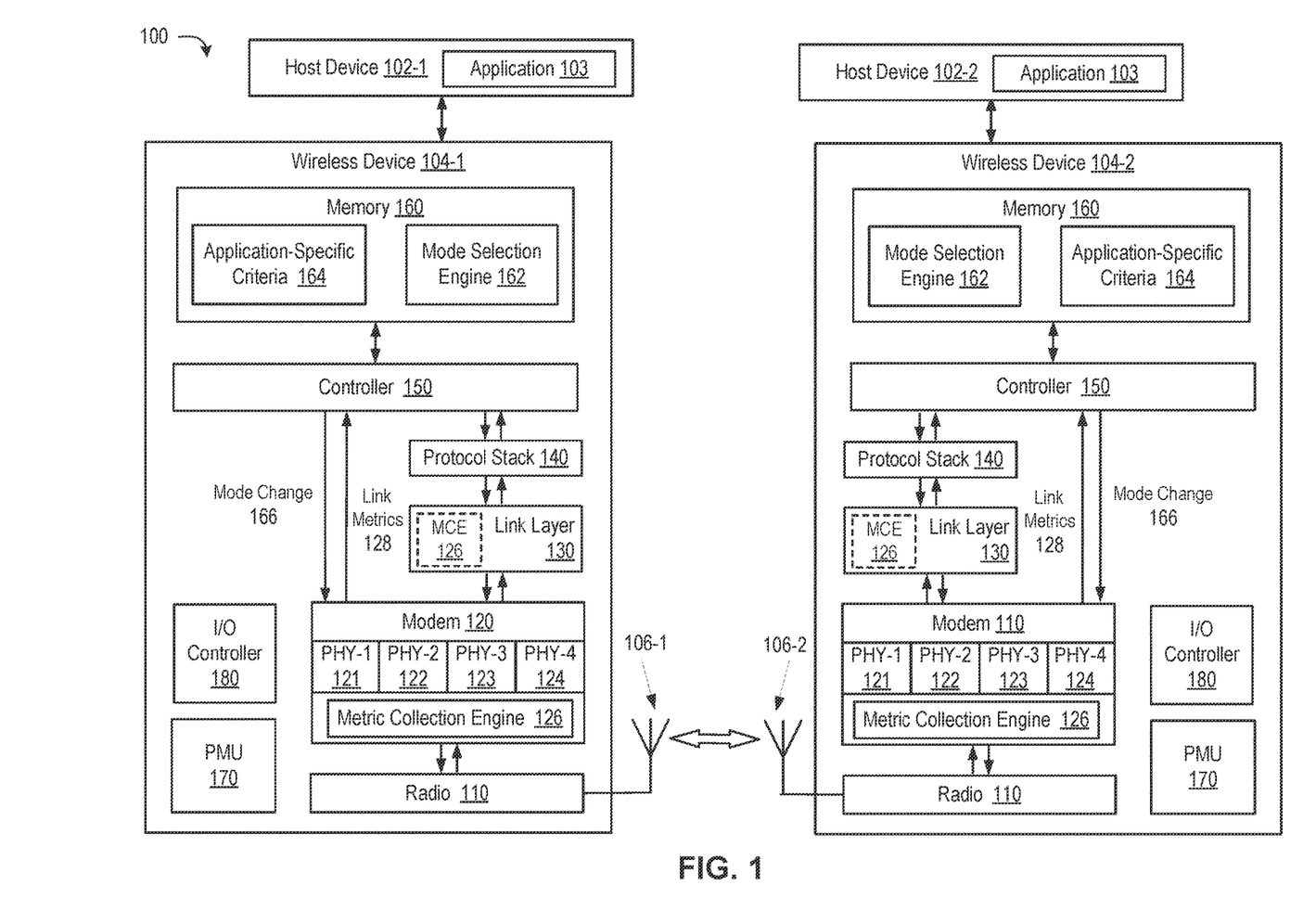
FIG. 1 illustrates one exemplary implementation of a wireless system capable of supporting dynamic operation mode monitoring and switching for improved quality of network connections, in accordance with some implementations.

FIG. 1 illustrates one exemplary implementation of a wireless system 100 capable of supporting dynamic operation mode monitoring and switching for improved quality of network connections, in accordance with some implementations. Wireless system 100 may be a BL network, a BLE network, or any other type of a personal area network. Wireless system 100 may include any number of host devices 102-n. A host device 102-n may be any desktop computer, laptop computer, tablet, phone, smart TV, sensor, appliance, system controller (e.g., an air conditioning, heating, water heating controller), component of a security system, medical testing or monitoring equipment, or any other type of a device. Each of the host devices 102-n may be coupled (e.g., via a wired connection) to a respective wireless device 104-n. For brevity, shown are two wireless devices 104-1 and 104-2, but it should be understood that wireless system 100 may include any number of such wireless devices. Wireless system 100 may be configured with any of the network devices 104-1 designated as a central device or a peripheral device. In some implementations, wireless device 104-1 and/or wireless device 104-2 may be implemented as an integrated circuit (IC) device (e.g., disposed on a single semiconductor die). Various modules and components of wireless device 104-1 and/or wireless device 104-2 are denoted with the same numbers, but it should be understood that such modules and components may be implemented in wireless device 104-1 and wireless device 104-2 using different hardware and software platforms. Some modules and components may be absent. For example, metric collection engine 126 and/or mode selection engine 162 may be present on wireless device 104-1 but not wireless device 104-2 (or vice versa).

Wireless device 104-1 may use one or more antennas 106-1 and wireless device 104-2 may use one or more antennas 106-1, to receive and transmit radio waves. A signal received by a respective antenna 106-n may be processed by radio 110 which may be a module that include filters (e.g., band-pass filters), low-noise radio-frequency amplifiers, down-conversion mixer(s), intermediate-frequency amplifiers, analog-to-digital converters, inverse Fourier transform modules, deparsing modules, interleavers, error correction modules, scramblers, and other (analog and/or digital) circuitry that may be used to process modulated signals received by antenna(s) 106-n. Radio 110 may provide the received (and digitized) signals to a modem 120. Modem 120 may include multiple PHY layer components, e.g., PHY 121-124. Each of PHY 121-124 support a respective operation mode, e.g., BLE operation mode. Although four PHY layer components are shown, modem 120 may include any suitable number of PHY layers (supporting a respective number of operation modes). A PHY layer component may convert the digitized signals received from radio module 110 into frames that can be fed into a Link Layer 130. Link Layer 130 may have a number of states, such as advertising, scanning, initiating, connection, standby. Link Layer 130 may transform frames into data packets. During transmission, data processing may occur in the opposite direction, with Link Layer 130 transforming data packets into frames that are then transformed by one of PHY 121-124 into digital signals provided to radio 110. Radio 110 may convert digital signals into radio signals and transmit the radio signals using antennas 106-n. In some implementations, radio 110, PHY 121-124, and Link Layer 130 may be implemented as parts of a single integrated circuit.

Each wireless device 104-n may have a protocol stack 140. The protocol stack 140 may include a number of protocols, e.g., Logical Link Control Adaptation Protocol (L2CAP), which may perform segmentation and reassembly of data packets that are generated by one or more applications 103 operating on host device 102-n. Specifically, L2CAP may segment data packets of arbitrary size, as output by the application(s) 103, into packets of the size and format that can be processed by Link Layer 130. L2CAP may also perform error detection operations. The protocol stack 140 may also include generic access profile (GAP) and generic attribute profile (GATT). GAP may specify how wireless device 104-n advertises itself on the wireless network, discovers other network devices, and establishes wireless links with the discovered devices. The protocol stack 140 may further include a security manager (SM) that controls how pairing, signing, and encryption of data is performed. GATT may specify how a data exchange between wireless device 104-1 and wireless device 104-2 is to occur once the connection between the two devices is established. GATT may use attribute protocol (ATT) that specifies how units of data are transferred between devices. Wireless device 104-n may also include other components not explicitly shown in FIG. 1, such as a host-controller interface.

Wireless device 104-n may include one or more processing devices or controllers 150. In some implementations, controller(s) 150 may include one or more central processing units (CPUs), finite state machines (FSMs), field-programmable gate arrays (FPGAs), application-specific integrated circuits (ASIC), or the like. Controller(s) 150 may be a single processing device that executes various operations of dynamic OM monitoring and switching that may be running on wireless device 104-n. In some implementations, wireless device 104-n may have a dedicated processor for OM switching operations that is separate from a processor that executes other operations on wireless device 104-n (e.g., processes associated with data transmission and reception).

Wireless device 104-n may also include a power management unit (PMU) 170, which manages clock/reset and power resources. Wireless device 104-n may further contain an input/output (I/O) controller 180 to enable communications with other external devices (including non-network devices) and structures. In some implementations, I/O controller 180 may enable a general purpose I/O (GPIO) interface, a USB interface, a PCM digital audio module, and other I/O components.

Wireless device 104-n may further include a memory 160, which may be (or include) a non-volatile, e.g., read-only (ROM) memory, and volatile, e.g., random-access (RAM), memory. Memory 160 may store codes and supporting data for a mode selection engine (MSE) 162 that implements dynamic mode evaluation, selection and switching. Memory 160 may also store application-specific criteria 164 identifying characteristics of the wireless connection that are of importance to execution of application(s) 103. MSE 162 may be executed by controller 150 and may use link metrics 128 generated by a metric collection engine 126 of modem 120. Metric collection engine 126 may measure a received signal strength indicator (RSSI) for the wireless connection established between wireless devices 104-1 and 104-2. Metric collection engine 126 may also determine (e.g., based on RSSI) a signal-to-noise ratio (SNR) indicating an amount of interference present in the environment. Metric collection engine 126 may further determine a number of metrics characterizing the quality of the wireless link established between wireless devices 104-1 and 104-2, such as throughput, packet loss rate, transmission latency time, packet retransmission rate, power consumption, and the like. Collection of wireless link quality metrics may be performed (as depicted schematically with the dashed box in FIG. 1), as part of a metric collection engine 126 operating within or in association with Link Layer 130.

Based on the link metrics 128 received from modem 120, MSE 162 may evaluate a utility values that characterize, application-specific (e.g., in relation to application(s) 103) quality of the established wireless connection in the current operation mode as well as projected utility values that are expected for various other operation modes if the wireless connection is switched to the corresponding modes. Based on the obtained utility values, controller 150 executing MSE 162 may output instructions to implement a mode change 166. Controller 150 may further cause link layer 130 to generate one or more frames with a request that the second wireless device transition to the newly selected operation mode. After the second wireless device acknowledges receiving the request, controller 150 reconfigures modem 120 to a different PHY layer component and begins transmitting and receiving data frames using the new operation mode. Subsequent to the operation mode change, metric collection engine 126 may continue collecting metrics about the environment to facilitate further monitoring of the wireless link in the new operation mode. Using the collected metrics, MSE 162 continues to evaluate the quality of the wireless connection in view of the application-specific criteria 164.

Figure 2A:
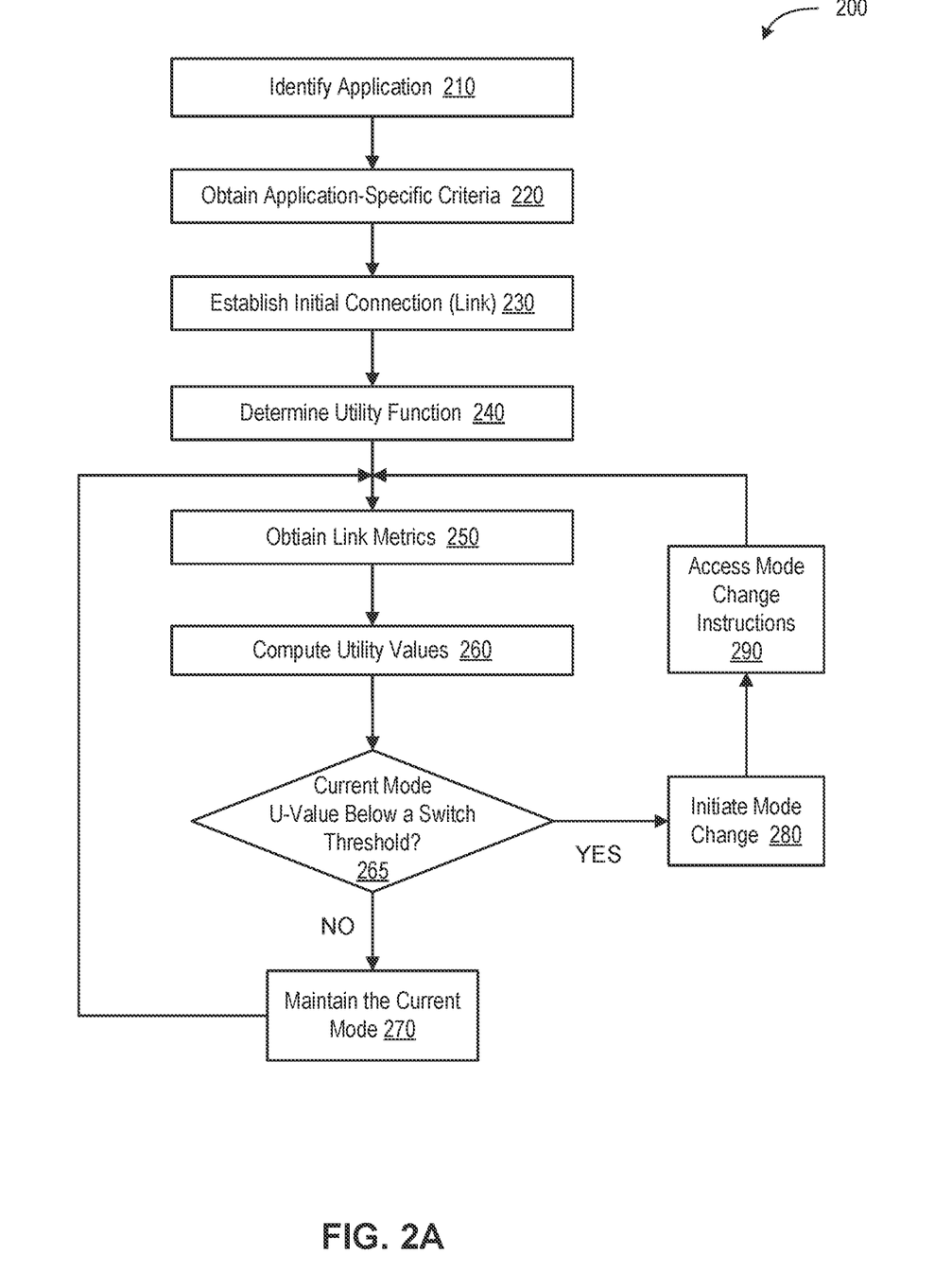
FIG. 2A illustrates example operations of dynamic operation mode evaluation and switching in wireless devices, performed in accordance with some implementations.

FIG. 2A illustrates example operations 200 of dynamic operation mode evaluation and switching in wireless devices, performed in accordance with some implementations. Example operations 200 may be performed by a network device (e.g., network device 104-1 of FIG. 1) alone or in combination with a host device (e.g., host device 102-1). Example operations 200 may be performed by a controller of a wireless device (e.g., controller 150) performing instructions of a mode selection engine (e.g., MSE 162). For example, operations of dynamic evaluation and switching may include (block 210) identifying (one or more) application(s) executed by the host device. In some implementations, any part of the application may be executed on the network device or the whole application may be executed entirely on the network device. The application may be any personal, industrial, medical, scientific, etc., application that involves communicating (transmitting and/or receiving data) with a different host device and a network device (e.g., host device 102-2 and network device 104-2). For example, host device 102-1 may include a video surveillance application, which generates video data using a video camera connected to host device 102 and transmits the video data using a BLE network device (network device 104-1) to a server (host device 102-2) via the server's BLE network device (network device 104-2). As another example, host device 102-1 may include an audio streaming application and host device 102-2 may have speakers that deliver the audio to a user.

The network device may also obtain application-specific criteria (block 220). The application-specific criteria may prioritize different performance categories. For example, an application that uploads data to a server for a later offline processing (that is not time-sensitive) may not prioritize throughput or latency very highly, but may prioritize energy economy. An application that streams an audio or a video file that is being delivered to a user who listens to (or views) the stream in real time may prioritize low latency over high throughput, but may still value throughput as an important performance category. A phone call (or audio conferencing) application may be tolerant to a certain decrease of a throughput, but may prioritize a low number of audio data packets that are discarded (e.g., after the packets fail to be transmitted after a certain maximum allowed time delay). Application-specific criteria may be communicated to the network device by the host device. In some implementations, application-specific criteria may be stored in the memory of the network device and accessed by the controller of the network device after the application is identified. For example, application-specific criteria may be stored in the form of reference tables with various performance categories ranked in the order of importance or given explicit importance ratings according to any suitable scale (with one or more categories possibly sharing the same rankings).

Based on the obtained application-specific criteria, the network device may select an operation mode (e.g., 2 Mbps BLE mode), establish (block 230) an initial connection with the second network device, and begin transmitting (or receiving) data to (from) the second network device. The network device may determine (block 240) a utility function $U_{\{P\}}(\{M\})$ to be used to evaluate a utility of the established network connection to the application. The utility function $U_{\{P\}}(\{M\})$ may be a function of a set of metrics $\{M\} = M_1 \ldots M_N$ collected and/or inferred by the wireless device and may depend on a set of parameters $\{P\} = P_1 \ldots P_n$ identified based on the application-specific criteria. In one implementation, the utility function may be a weighed sum of various metrics, e.g.

$$U_{\{P\}}(\{M\}) = \sum_{j=1}^{N} W_j(\{P\}) \cdot M_j,$$

where weights $W_j(\{P\})$ depend on the parameters and may be positive or negative. For example, if the metrics include throughput $M_1 = T$ and latency $M_2 = L$, the utility function may be $$U(T,L) = W_1 \cdot T - W_2 \cdot L$$

with positive weights $W_1$ and $W_2$. In applications where throughput is prioritized over latency, weight $W_1$ may have an increased value. Similarly, in applications where latency is prioritized and is to be avoided even at a cost of some drop in the throughput, weight $W_2$ may be given a bigger value. In some implementations, the utility function may be a nonlinear function of the metrics $\{M\}$, e.g., a power-law function, $$U(T,L) = W_1 \cdot T^\alpha - W_2 \cdot L^\beta$$

with some exponents $\alpha$ and $\beta$. Various parameters, such as weights and exponents, $W_1$, $W_2$, $\alpha$, $\beta$, etc., may be determined empirically, using equipment testing. In some implementations, the utility function $U_{\{P\}}(\{M\})$ may use various other functions of the metrics (e.g., non-linear and non-power-law functions), such as sigmoid functions, logarithmic functions, and so on.

Figure 2B:
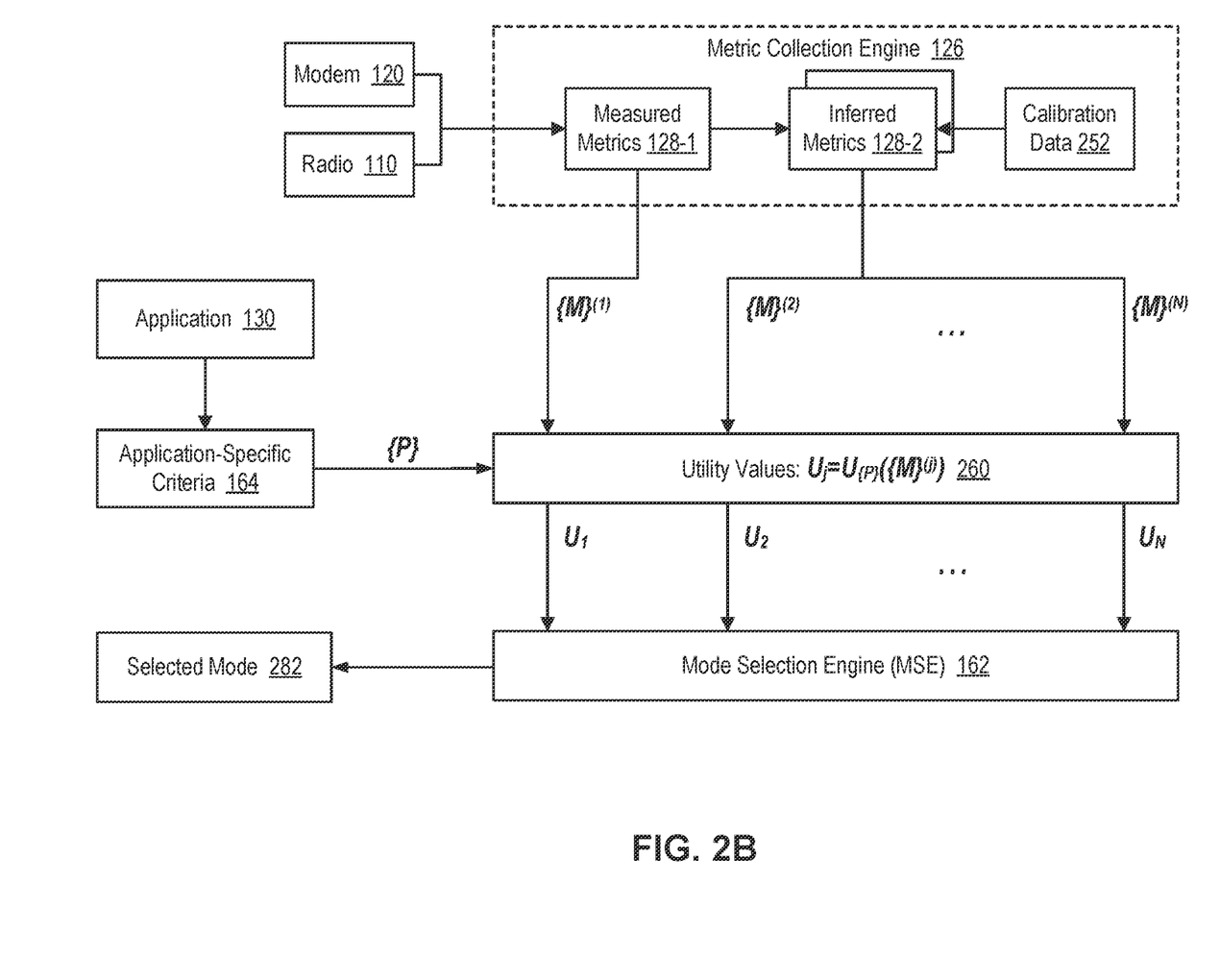
FIG. 2B depicts schematically a process of collection and use of link metrics, in accordance with some implementations.

In the course of data transmissions and/or receptions, the wireless device may obtain connection (link) metrics (block 250). FIG. 2B depicts schematically a process of collection and use of link metrics, in accordance with some implementations. Radio 110 and modem 120 may perform a series of measurements (which may be repeated periodically) to assess the state of the wireless connection and to provide results of the measurements (link metrics 128) to metric collection engine 126. Link metrics may include both directly measured metrics 128-1 and inferred metrics 128-2 that are obtained based on measured metrics 128-1. For example, measured metrics 128-1 may include RSSI of the signal and a noise level of the wireless network (with the two quantities expressed in, e.g., decibels). A difference between the RSSI and the noise level may represent the SNR of the wireless link. RSSI and SNR, and other similar metrics, such as antenna gain, power consumed by the network device, etc., are physical metrics representative of the analog quality of the wireless link. Metric collection engine 126 may further collect one or more communication metrics, such as a throughput of the link, e.g., an average number of bits transmitted (and/or received) by the wireless device over a predetermined time interval. Communication metrics may also include a transmission latency time, e.g., an average (over a predetermined time interval) time that a packet is awaiting transmission. Communication metrics may further include a packet retransmission rate, e.g., an average number (or a fraction) of packets that have not been transmitted successfully on the first attempt and had to be retransmitted. Communication metrics may include a packet loss rate, e.g., an average number (or fraction) of packets that had to be dropped from the transmission queue upon expiration of a maximum waiting time. Communication metrics may also include various other metrics representative of the digital quality of the wireless link.

Measured metrics 128-1 may be representative of both the physical environment of the wireless network and the quality of the wireless link that uses a current OM, e.g., OM-1 (which may be any OM of the OMs supported by modem 120). Some or all of the measured metrics 128-1, herein denoted with $\{M\}^{(1)}$, may be input into the utility function $U_{\{P\}}(\{M\})$, which produces a utility value $U_1 = U_{\{P\}}(\{M\}^{(1)})$ representative of the utility of the network link that uses the current OM-1. Additional utility values representative of a projected utility of other OMs may further be computed. More specifically, metric collection engine 126 may determine a set of inferred metrics 128-2 for at least one (or, in some implementations, all) of the remaining OMs. In some implementations, metric collection engine 126 may access calibration data 252 that projects various metrics expectations for a different OM-j ($j \neq 1$) under the same or similar environmental conditions as currently existing for OM-1. For example, calibration data 252 may indicate a likely throughput T, latency L, and so on. The inferred metrics 128-2, herein denoted with $\{M\}^{(j)}$, may also be input into the utility function $U_{\{P\}}(\{M\})$, which produces one or more projected utility values $U_j = U_{\{P\}}(\{M\}^{(j)})$ representative of the expected utilities of the current state of the wireless network for various other ($j \neq 1$) available OMs.

After various utility values have been computed (at block 260), MSE 162 may determine (decision-making block 265 in FIG. 2A), whether the current utility value $U_1$ is below a threshold for switching from the current OM-1 to some other OM. The corresponding decision-making process is described in more detail in relation to FIG. 3A and FIG. 3B below. If the utility value (U-value) for the current mode is not below the switching threshold, the wireless device may maintain the current mode (block 270 in FIG. 2A). If the utility value for the current mode is below the switching threshold, the controller of the wireless device (or the host of the wireless device) may initiate a mode change process (block 280 in FIG. 2A) to the newly selected mode (block 282 in FIG. 2B). More specifically, the controller may access stored (or generate) mode change instructions (block 290 in FIG. 2A), generate a request (or instructions) to the second network device to transition to a new OM, generate one or more data packets with the request (or instructions), provide the generated data packet(s) to the Link Layer to transform the data packet into one or more frames that are then transmitted to the second network device using modem 120 and radio 110.

In some implementations, the initial OM selected at the start of the wireless connection may be a default OM. In some implementations, the initial OM may be specified by the host device. In some implementations, the initial OM may be selected based on the selection process described in conjunction with FIG. 2A and FIG. 2B, e.g., based on link quality metrics collected using advertising packets received from the network device 104-2 (or other network devices).

Figure 3A:
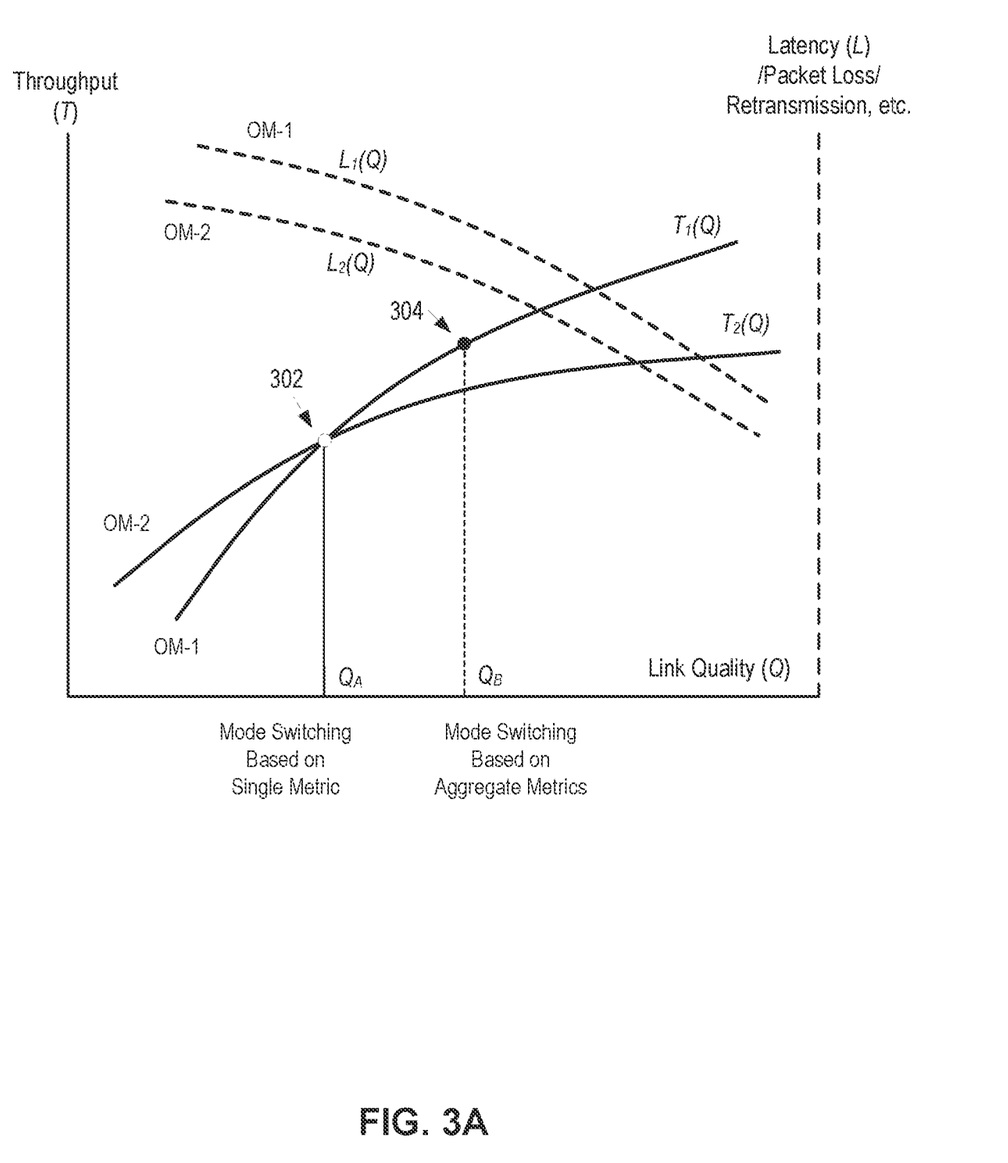
FIG. 3A illustrates example process of decision-making in the course of dynamic operation mode evaluation and switching in wireless devices, performed in accordance with some implementations.

FIG. 3A illustrates example process of decision-making in the course of dynamic operation mode evaluation and switching in wireless devices, performed in accordance with some implementations. Horizontal axis corresponds to any suitable quantity that is representative of a link quality Q, which may be RSSI, SNR, attenuation of a radio signal between two communicating wireless devices, and the like. It should be understood that a single link quality Q is merely depicted for illustration purposes and that the link quality Q may include multiple different quantities, $Q = Q_1, Q_2 \ldots$ (e.g., RSSI, SNR, noise level, energy consumption, etc.). Solid lines depict dependence of some link communication metric, e.g., throughput T, on the signal quality, in two operation modes, e.g., $T_1(Q)$ (mode 1) and $T_2(Q)$ (mode 2). Dashed lines depict a similar dependence of some other link communication metric, e.g., latency L, on the signal quality, in the respective operation modes, e.g., $L_1(Q)$ (mode 1) and $L_2(Q)$ (mode 2). It should be understood that two sets of curves $T_j(Q)$ and $L_j(Q)$ that depend on a single link quality Q value is intended as illustration only and that in various implementations a substantially larger set of functions (e.g., including but not limited to packet loss rate, retransmission rate, consumption, etc.) may be similarly defined as depending on a set of link metrics $Q = Q_1, Q_2 \ldots$ (e.g., RSSI, SNR, etc.). The corresponding curves, which may be stored as tables, lists of values, or in any other suitable form in memory 160 of the wireless device (e.g., as part of calibration data 252), may be obtained by field testing of the wireless device, or computed using a variety of modeling and simulation techniques, or using any combination thereof.

An application (e.g., application 103) that prioritizes throughput over other metrics may predicate switching from one OM to another OM based on where the current state of the wireless link is relative to a crossing point $Q_A$ 302 (depicted with a white circle) of the curves $T_1(Q)$ and $T_2(Q)$. For example, OM-1 may be a higher bitrate mode than mode OM-2 and at higher link quality Q values may provide a higher throughput $T_1(Q) > T_2(Q)$, when $Q > Q_A$. OM-1, on the other hand, may be more susceptible to degradation at lower link quality Q values than OM-2, so that OM-2 may be a preferred mode for $Q<Q_A$. Accordingly, in some implementations, metric collection engine 126 may determine (e.g., measure and/or compute) the current quality value Q, the current throughput value T in OM-1, access calibration data 252, and determine the projected throughput $T_2(Q)$ for OM-2 if the switching transition were performed under the current conditions of the wireless network. In some implementations, instead of measuring the current throughput value T, metric collection engine 126 may also estimate this value from a respective calibration data stored as a calibration dependence $T_1(Q)$. Based on results of a comparison of the measured throughput value T (or inferred value $T_1(Q)$) and projected throughput value $T_2(Q)$, performed by mode selection engine 162, controller 150 may initiate a change of the operation mode from OM-1 to OM-2 or stay in mode OM-1 depending on which side of the point 302 the state of the wireless connection currently resides.

Inclusion of other metrics, such as latency, in the utility function that is used to compare operation modes performances, may change the decision-making and locations of the switching points. For example, the utility function may account for both throughput and latency, e.g., linearly (for the sake of simplicity):

$$U(T,L)=W_1 \cdot T - W_2 \cdot L,$$

where latency may be higher (as a way of illustration and not limitation) in OM-1 than in OM-2. This may favor staying in OM-2 even for a range of link quality values where $Q>Q_A$. At a certain point $Q_B$ 304 (depicted with a white circle) beyond which (in the region where $Q>Q_B$) the advantage of the elevated throughput may outweigh an increase in latency, $$W_1 \cdot [T_1(Q)-T_2(Q)] > W_2 \cdot [L_1(Q)-L_2(Q)],$$

so that switching from OM-1 to OM-2 may become beneficial. The value $L_1(Q)$ may be measured (or inferred from calibration data 252) similarly to the throughput value $T_1(Q)$ and value $L_2(Q)$ may be projected based on the calibration data 252. Similar analysis may be performed for any utility function that depends on an arbitrary number of metrics that depend on more than one variable. Any number of OMs may be evaluated in the same or a similar manner with multiple switching points (OM-j→OM-k) occurring between various operation modes.

Figure 3B:
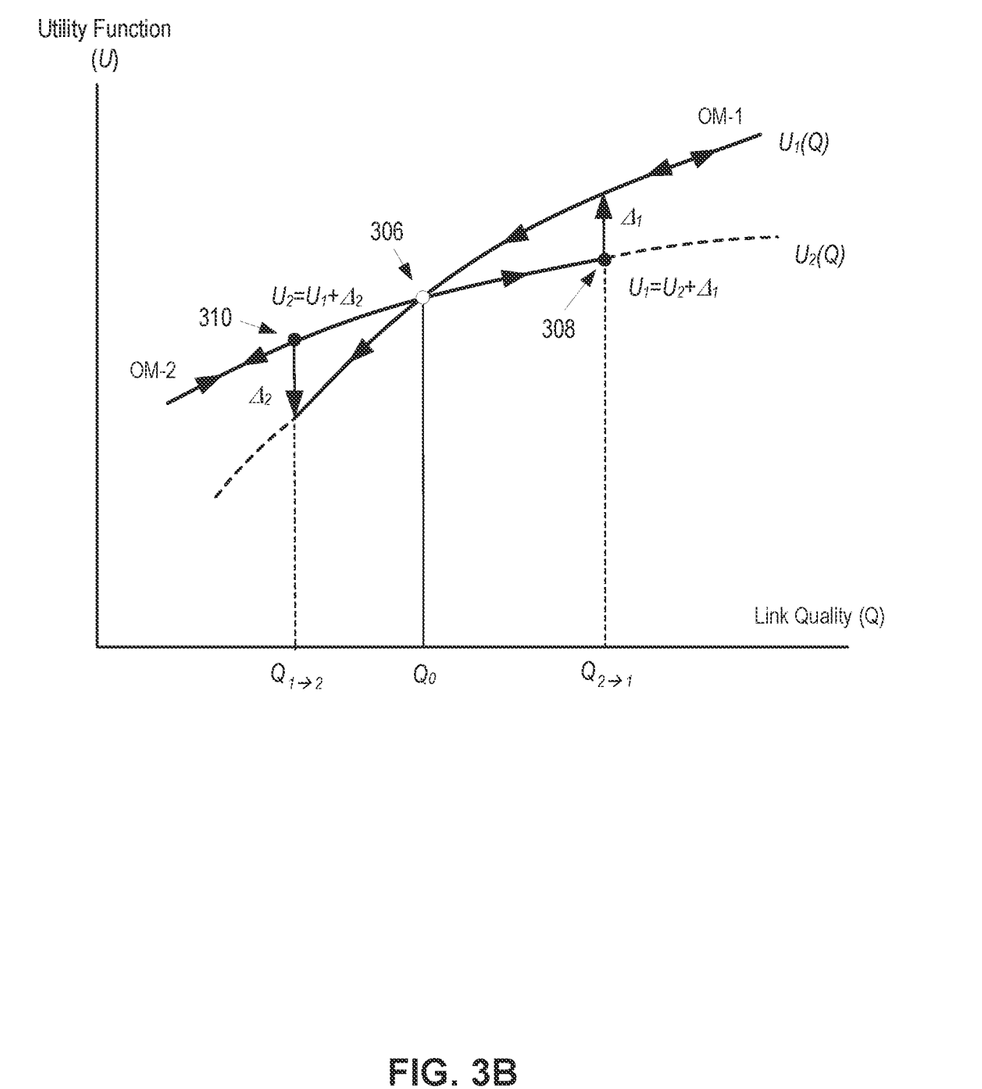
FIG. 3B illustrates a hysteresis-based process of decision-making in the course of dynamic operation mode evaluation and switching in wireless devices, performed in accordance with some implementations.

FIG. 3B illustrates a hysteresis-based process of decision-making in the course of dynamic operation mode evaluation and switching in wireless devices, performed in accordance with some implementations. For brevity and conciseness, shown is a utility function determined for two operation modes and one variable (link quality Q, but any number of operation modes that depend on an arbitrary number of variables may be evaluated in a similar manner. In those instances where link quality Q hovers near a point $Q_0$ 306 (depicted with a white circle), where the two utility functions have the same value, $U_1(Q_0)=U_2(Q_0)$, the mode selection engine 162 may initiate multiple OM changes from OM-1 to OM-2 and back. Each OM change may have a certain amount of overhead, in temporarily increased latency, delayed transmission of data packets, lost data packets, increased energy consumption, and the like.

To prevent such hopping back and forth between the modes, hysteresis-based decision-making may be implemented. More specifically, when the wireless device communicates in OM-2 and the quality of the wireless link is improving past point $Q_0$ 306 (depicted with a white circle), the wireless device may remain in OM-2 until the utility value of OM-1 exceeds the utility value of OM-2 by a certain threshold, $\Delta_1$:

$$U_1 > U_2 + \Delta_1.$$

At this point $Q_{2 \to 1}$ 308 (depicted with a black circle), mode selection engine 162 may initiate a transition from OM-2 to OM-1.

Similarly, when the wireless device communicates in OM-1 and the quality of the wireless link is degrading past point $Q_{2 \to 1}$ 308 and point $Q_0$ 306, the wireless device may remain in OM-1 until the utility value of OM-2 exceeds the utility value of OM-1 by another threshold, $\Delta_2$:

$$U_2 > U_1 + \Delta_2.$$

At this point $Q_{1 \to 2}$ 310 (depicted with another black circle), mode selection engine 162 may initiate a transition from OM-1 to OM-2. The magnitudes of the thresholds $\Delta_1$ and $\Delta_2$ may be selected large enough to offset an overhead of the mode switching. In some implementations, the thresholds $\Delta_1$ and $\Delta_2$ may be the same. In some implementations, the thresholds $\Delta_1$ and $\Delta_2$ may be different and may further depend on the type and demands of the application being supported by the wireless link. Hysteresis-based decision-making may be applied to all or some of OM transitions (OM-j→OM-k).

Figure 4:
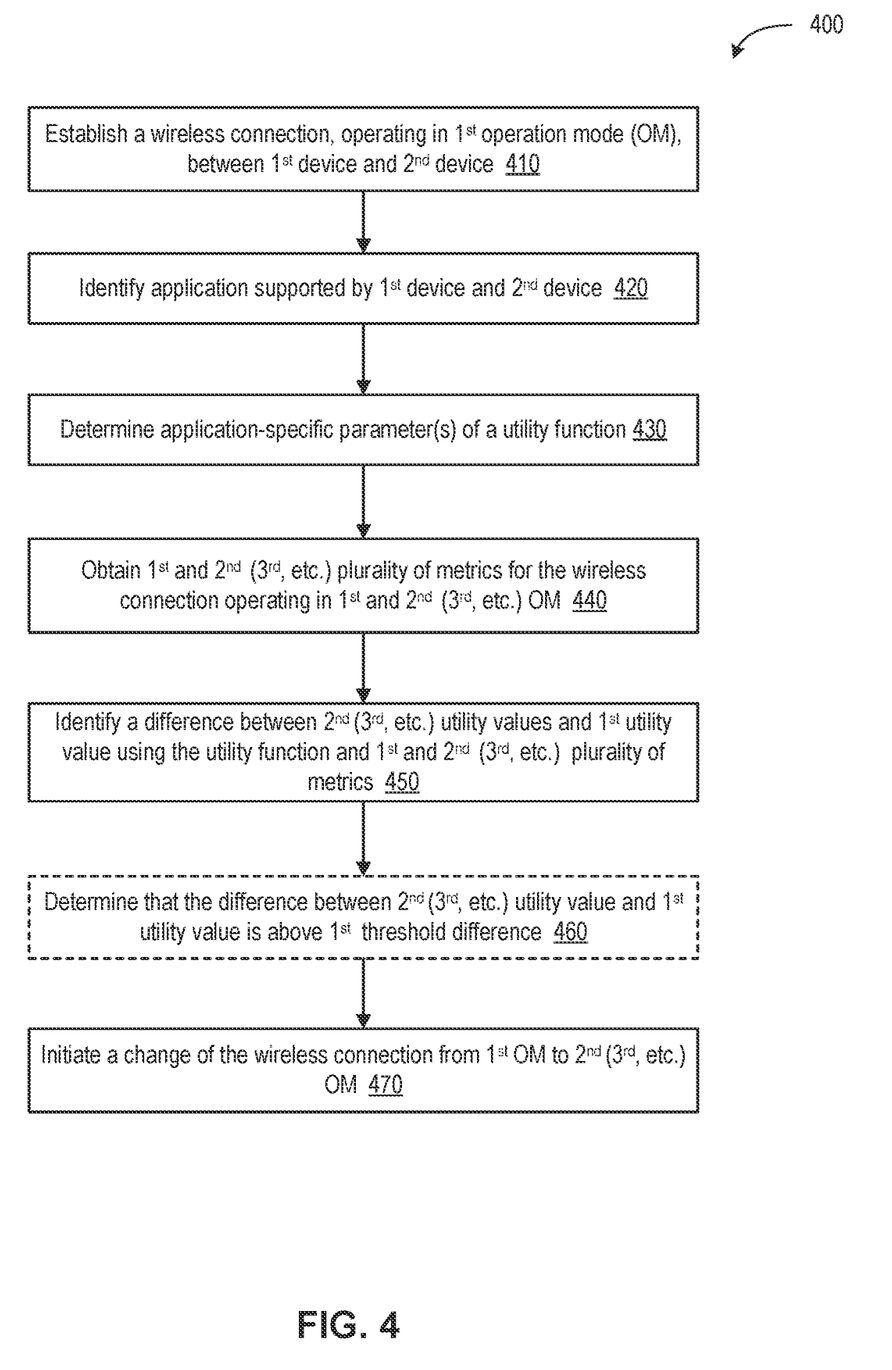
FIG. 4 is a flow diagram of an example method of initial operation mode selection, evaluation, and switching in wireless devices, in accordance with some implementations.
Figure 5:
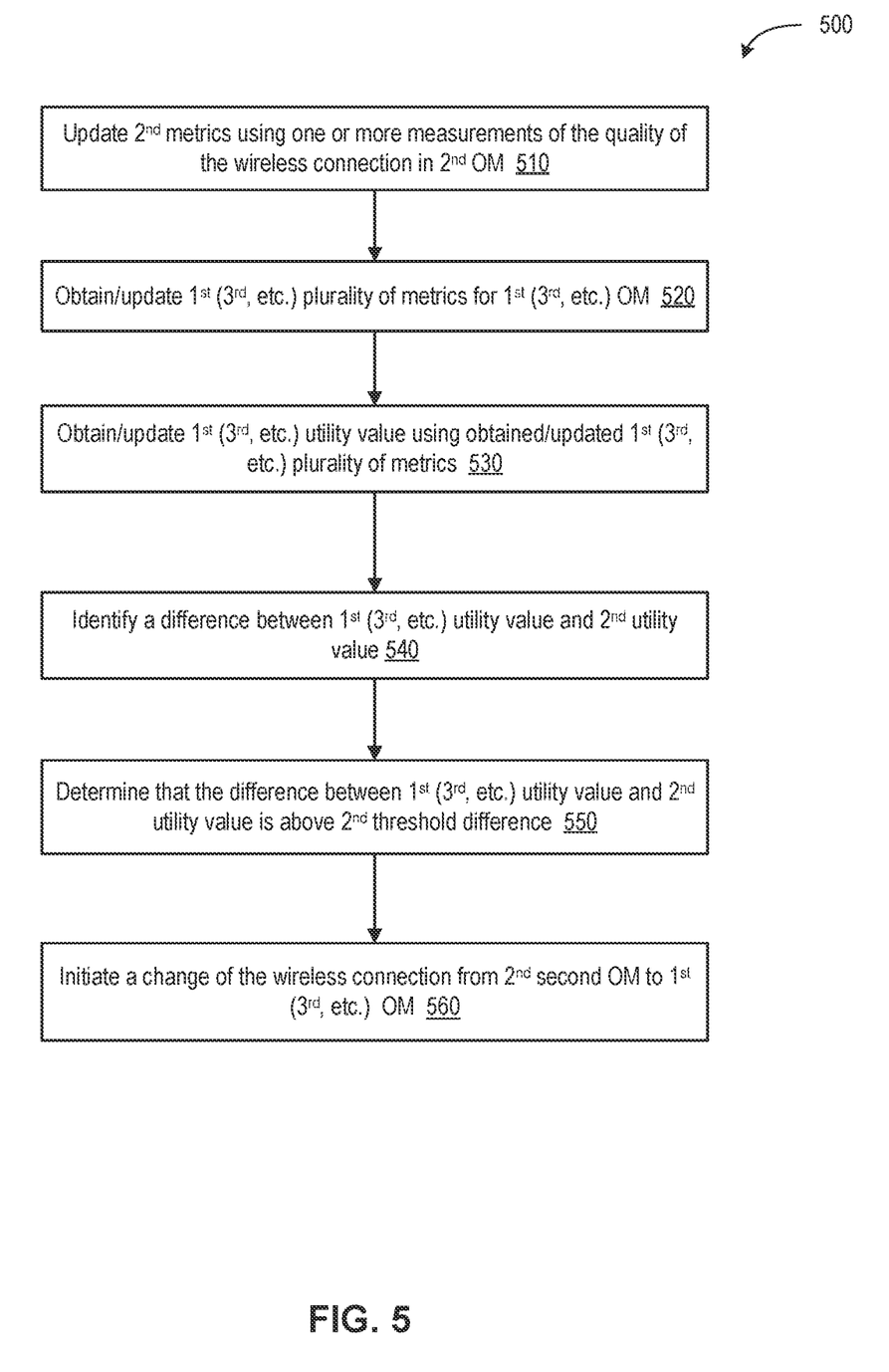
FIG. 5 is a flow diagram of an example method of operation mode performance monitoring and switching in wireless devices, in accordance with some implementations.

FIG. 4 and FIG. 5 are flow diagrams of example methods 400 and 500 of dynamic OM selection, in accordance with some implementations. Methods 400 and 500 may be performed to optimize a wireless connection between wireless devices in the course of changing conditions (e.g., environmental conditions). Methods 400 and 500 may be performed to identify and select an OM that is best suited, under the current conditions, to provide an adequate support to a particular type of an application that is using the wireless connection. Multiple wireless devices of any given wireless network may be performing methods 400 and 500 in parallel (e.g., concurrently). Methods 400 and 500 may be performed by a processing logic of a wireless device interacting with at least one other wireless device. The processing logic performing methods 400 and 500 may include hardware (e.g., circuitry, dedicated logic, programmable logic, microcode, etc.), firmware, and/or software, or any combination thereof. In some implementations, methods 400 and 500 may be performed by a controller 150 (or any other processing logic) of wireless device 104-2 of FIG. 1. The wireless controller 150 performing methods 400 and 500 may receive data (e.g., link connection metrics) from radio 110, modem 120, and other components/modules. In some implementations, the processing logic performing methods 400 and 500 may execute instructions of mode selection engine 162. In certain implementations, methods 400 and 500 may be performed by a single processing thread. Alternatively, each of methods 400 and 500 may be performed by two or more processing threads, each thread executing one or more individual functions, routines, subroutines, or operations of the corresponding method. The processing threads implementing method 400 or method 500 may be synchronized (e.g., using semaphores, critical sections, and/or other thread synchronization mechanisms). Alternatively, the processing threads implementing method 400 or method 500 may be executed asynchronously with respect to each other. Various operations of methods 400 and 500 may be performed in a different order compared with the order shown in FIG. 4 and FIG. 5. Some operations of methods 400 and 500 may be performed concurrently with other operations. Some operations may be optional.

FIG. 4 is a flow diagram of an example method 400 of initial operation mode selection, evaluation, and switching in wireless devices, in accordance with some implementations. Method 400 may be performed to establish a wireless connection between wireless devices, selecting an initial OM, monitoring performance of the initial OM, and switching to a different OM once it is determined that the initial OM has a suboptimal performance given the current conditions. More specifically, at block 410, method 400 may involve establishing a wireless connection between a first device and a second device. In some implementations, the first device and a second device may be BT devices, BLE devices, or any other personal area network devices. The established wireless connection may be operating in a first OM associated with a first data transmission rate. The first OM may be any OM supported by the first network device and the second network device. For example, supported OMs may include various BLE OMs, such as a 1 Mbps LE operation mode, a 2 Mbps LE operation mode, a 500 kbps S2 LE Coded operation mode, or a 125 kbps LE Coded S8 operation mode.

The initial first OM may be a default OM or an OM specified by the host device, e.g., host device 102-1 of the first network device 104-1 or host device 102-2 of the second network device 104-2. In some implementations, the initial OM may be selected by implementing at least some operations of blocks 420-450 described below.

At block 420, method 400 may include identifying an application supported by the first network device and the second network device. In some implementations, the identification of the application may be provided by the host device when the application is being instantiated on the host device. For example, the application may have multiple components, such as a server component instantiated on the first network device and a client component instantiated on the second network device (e.g., an audio streaming component and an audio receiving component). The identification of the application may include an identification of a type of the application, an identification of resources required for successful execution of the application (e.g., throughput, latency, maximum packet loss rate, etc.), and the like.

At block 430, the processing logic performing method 400 may determine, in view of the identified application, one or more application-specific parameters $\{P\}=P_1, P_2 \ldots$ of an OM utility function $U_{\{P\}}(M_1, M_2 \ldots)$. The OM utility function $U_{\{P\}}(M_1, M_2 \ldots)$ may be a function of a plurality of metrics $M_1, M_2 \ldots$, e.g., a weighted combination of each of the plurality of metrics. The plurality of metrics $M_1, M_2 \ldots$, may include physical metrics, such as RSSI of the wireless connection, SNR of the wireless connection, power consumption of the wireless connection, and so on. The plurality of metrics $M_1, M_2 \ldots$, may also include communication metrics, such as a throughput of the wireless connection, a representation of a signal strength of the wireless connection, a packet loss rate of the wireless connection; a transmission latency time of the wireless connection, a packet retransmission rate of the wireless connection, and so on. The weights of the weighted combination may be determined based on the application-specific parameters.

At block 440, method 400 may continue with obtaining values of the first (second, third, etc.) plurality of metrics $\{M\}^{(1)}$ ($\{M\}^{(2)}$, $\{M\}^{(3)}$, etc.) characterizing quality of the wireless connection operating in the first (second, third, etc.) OM. Some of the metrics $\{M\}^{(1)}$ for the first (currently active) OM may be directly measured while some of the metrics $\{M\}^{(1)}$ for the first OM may be inferred based on the measured metrics. Some of the metrics $\{M\}^{(2)}$ ($\{M\}^{(3)}$, etc.) characterizing quality of the second (third, etc.) OM may be predicted based on metrics $\{M\}^{(1)}$. For example, throughput and latency for the second OM may be predicted based on the physical metrics (e.g., the RSSI, SNR, etc.) and/or communication metrics (throughput, latency, etc.) of the current (first) OM. Obtaining the second (third, etc.) plurality of metrics that predict a quality of the wireless operating in the second OM may include accessing stored calibration data (e.g., calibration data 252 of FIG. 2B) that predicts the second plurality of metrics in view of one or more metrics of the first plurality of metrics.

At block 450, the processing logic performing method 400 may identify a difference between a second (third, etc.) utility value and a first utility value $U_2-U_1$ ($U_3-U_1$, etc.). The j-th utility value may be obtained by applying the OM utility function to the j-th plurality of metrics. In some implementations, the difference $U_2-U_1$ may be identified by first computing the values $U_2$ and $U_1$ and then computing the difference $U_2-U_1$ (and similarly, for a third OM, fourth OM, etc.). In some implementations, individual values $U_2$ and $U_1$ may not be computed. Instead, the processing logic may compute differences of the metrics, e.g., $M_1^{(2)}-M_1^{(1)}$, $M_2^{(2)}-M_2^{(1)}$, etc., and then compute the difference $U_2-U_1$ as the utility function of the differences of the metrics. For example, such a computation may be performed when the utility function is a linear function of the metrics.

At block 460, the processing device performing method 400 may determine that the difference $U_2-U_1$ ($U_3-U_1$, etc.) between the second (third, etc.) utility value and the first utility value is above a first threshold difference $\Delta_1$. At block 470, method 400 may continue with the processing logic initiating a change of the wireless connection from operating in the first OM to operating in the second (third, etc.) OM based on the identified difference $U_2-U_1$ ($U_3-U_1$, etc.). In some implementations, the change of the OM may be initiated and performed by a microcontroller of the first wireless device without notifying the host device or receiving instructions from the host device. In some implementations, any or all of the blocks 410-430 and 450-470 may be performed by a processing device of the host device.

FIG. 5 is a flow diagram of an example method 500 of operation mode performance monitoring and switching in wireless devices, in accordance with some implementations. Method 500 may be performed after method 400 is used for initial selection of a first OM and the subsequent switching to a second OM that has been determined to ensure a better performance for the application supported by the network devices. In the course of subsequent operations and data exchanges between the first network device and a second network device using the second OM, the condition of the environment may change in such a way that the second OM may no longer be optimal for the new conditions.

At block 510, method 500 may involve updating the second plurality of metrics $\{M\}^{(2)}$ using one or more measurements of the quality of the wireless connection operating in the second OM. For example, before switching from the first OM to the second OM, some of the second plurality of metrics may have been projected based on the metrics measured (or inferred) while the wireless connection was still using the first OM. After switching from the first OM to the second OM, the metric collection engine (e.g., metric collection engine 126) may determine new values of the second plurality of metrics $\{M\}^{(2)}$ based on measurements of the physical metrics (e.g., the RSSI, SNR, etc.) and/or communication metrics (throughput, latency, etc.) for the current (second) OM.

At block 520, method 500 may further include updating (or newly obtaining) the first (third, etc.) plurality of metrics $\{M\}^{(1)}$ ($\{M\}^{(3)}$, etc.). The updated/obtained first (third, etc.) first plurality of metrics may predict quality of the wireless connection for the currently inactive first (third, etc.) OM. As depicted with block 530, the updated first (third, etc.) utility value $U_1$ ($U_3$, etc.) may be obtained by applying the OM utility function to the updated/obtained first (third, etc.) plurality of metrics $\{M\}^{(1)}$ ($\{M\}^{(3)}$, etc.). At block 540, the processing logic performing method 500 may identify a difference between an updated/obtained first (third, etc.) utility value and an updated second utility value, $U_1-U_2$ ($U_3-U_2$, etc.). The updated second utility value is obtained by applying the OM utility function to the updated second plurality of metrics $\{M\}^{(2)}$. At block 550, the processing logic performing method 500 may determine that a difference between the updated first (third, etc.) utility value and the updated second utility value, $U_1-U_2$ ($U_3-U_2$, etc.) is above a second threshold difference $\Delta_2$.

At block 560, method 500 may continue with initiating a change of the wireless connection from operating in the second OM to operating in the first (third, etc.) OM. In some implementations, the change of the OM may be initiated and performed by a microcontroller of the first (or second) wireless device without notifying the host device or receiving instructions from the host device.

Various modification of methods 400 and 500 may be implemented. For example, the first threshold $\Delta_1$ and/or the second threshold $\Delta_2$ may be set to zero. For example, when $\Delta_1=0$ and $\Delta_2 \neq 0$, switching from the first OM to the second OM may be performed as soon as the second utility value $U_2$ exceeds the first utility value $U_1$, but the reverse switching (from the second OM to the first OM) may be performed when the first utility value $U_1$ exceeds the second utility value $U_2$ by at least the second threshold $\Delta_2$ (or vice versa).

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware or code set forth above may be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A method comprising:
   using a wireless connection operating in a first operation mode (OM) associated with a first physical layer supporting a first data transmission rate;
   determining one or more parameters of an OM utility function;
   obtaining a first plurality of metrics characterizing quality of the wireless connection operating in the first OM and a second plurality of metrics predicting quality of the wireless connection operating in a second OM associated with a second physical layer supporting a second data transmission rate;
   identifying a difference between a second utility value and a first utility value, wherein the first utility value is obtained by applying the OM utility function to the first plurality of metrics and the second utility value is obtained by applying the OM utility function to the second plurality of metrics; and initiating a change of the wireless connection from operating in the first OM to operating in the second OM based on the identified difference.

2. The method of claim 1, wherein each of the first OM and the second OM is one of a 1 Mbps LE operation mode, a 2 Mbps LE operation mode, a 500 kbps S2 LE Coded operation mode, or a 125 kbps LE Coded S8 operation mode.

3. The method of claim 1, wherein the first plurality of metrics comprises at least one of:
   a throughput of the wireless connection operating in the first OM,
   a representation of a signal strength of the wireless connection operating in the first OM, a packet loss rate of the wireless connection operating in the first OM,
   a transmission latency time of the wireless connection operating in the first OM, or a packet retransmission rate of the wireless connection operating in the first OM.

4. The method of claim 1, wherein obtaining the first plurality of metrics comprises determining at least one of:
   a received signal strength indicator (RSSI) of the wireless connection operating in the first OM, or
   a signal-to-noise ratio (SNR) of the wireless connection operating in the first OM.

5. The method of claim 1, wherein obtaining the second plurality of metrics predicting quality of the wireless connection operating in the second OM comprises:
   accessing a stored calibration data that predicts the second plurality of metrics in view of one or more metrics of the first plurality of metrics.

6. The method of claim 1, wherein the one or more parameters of the OM utility function comprise application-specific parameters determined in view of an application supported by the wireless connection.

7. The method of claim 6, wherein the OM utility function of the first plurality of metrics is a weighted combination of each of the first plurality of metrics, and wherein weights of the weighted combination are determined based on the application-specific parameters.

8. The method of claim 1, further comprising:
   updating the second plurality of metrics, using one or more measurements of the quality of the wireless connection operating in the second OM;
   obtaining a third plurality of metrics predicting quality of the wireless connection operating in a third OM associated with a third data transmission rate;
   identifying a difference between a third utility value and an updated second utility value, wherein the third utility value is obtained by applying the OM utility function of the third plurality of metrics and the updated second utility value is obtained by applying the OM utility function to the updated second plurality of metrics; and
   initiating a change of the wireless connection from operating in the second OM to operating in the third OM based on the identified difference between a third utility value and an updated second utility value.

9. The method of claim 1, wherein the change of the wireless connection is initiated responsive to determining that the difference between the second utility value and the first utility value is above a first threshold difference.

10. The method of claim 9, further comprising:
    updating the second plurality of metrics using one or more measurements of the quality of the wireless connection operating in the second OM;
    updating the first plurality of metrics, wherein the updated first plurality of metrics predicts quality of the wireless connection operating in the first OM;
    identifying a difference between an updated first utility value and an updated second utility value, wherein the updated first utility value is obtained by applying the OM utility function to the updated first plurality of metrics and the updated second utility value is obtained by applying the OM utility function to the updated second plurality of metrics;
    determining that a difference between the updated first utility value and the updated second utility value is above a second threshold difference; and
    initiating a change of the wireless connection from operating in the second OM to operating in the first OM.

11. An apparatus comprising:
    a wireless modem configured to support a plurality of operation modes (OMs), each of the plurality of OMs having a different maximum data transmission rate;
    a memory; and
    a processing device coupled to the memory, the processing device configured to:
      use a wireless connection operating in a first OM of the plurality of OMs, wherein the first OM is associated with a first physical layer;
      identify a plurality of criteria for evaluating utility of the wireless connection;
      obtain a plurality of metrics characterizing the wireless connection;
      determine, for each of the plurality of OMs, based on the plurality of criteria and the plurality of obtained metrics, a utility value characterizing an existing or a predicted utility of a respective one of the plurality of OMs; and
      select, based on the determined utility values, a second OM of the plurality of the OMs as a next OM for the wireless connection, wherein the second OM is associated with a second physical layer.

12. The apparatus of claim 11, wherein the processing device is further configured to:
    generate a request to a network device communicating with the apparatus using the wireless connection to reconfigure the wireless connection from the first OM to the second OM.

13. The apparatus of claim 11, wherein the plurality of OMs comprises two or more Bluetooth Low Energy (BLE) OMs.

14. The apparatus of claim 11, wherein the plurality of metrics comprises a first subset of physical metrics, the first subset of physical metrics comprising one or more of:
    a representation of a signal strength of the wireless connection, or
    a signal-to-noise ratio (SNR) of the wireless connection.

15. The apparatus of claim 14, wherein the plurality of metrics further comprises a second subset of communication metrics, the second subset of communication metrics comprising one or more of:
    a throughput of the wireless connection,
    a packet loss rate of the wireless connection,
    a transmission latency time of the wireless connection, or
    a packet retransmission rate of the wireless connection.

16. The apparatus of claim 14, wherein a utility value for the second OM is determined in view of a plurality of predicted metrics for a projected wireless connection in the second OM, the plurality of predicted metrics determined using the first subset of physical metrics and comprising one or more of:
  a throughput of the projected wireless connection,
  a packet loss rate of the projected wireless connection,
  a transmission latency time of the projected wireless connection, or
  a packet retransmission rate of the projected wireless connection.

17. A system comprising:
  a BLE device comprising:
    a radio comprising one or more antennas;
    a wireless controller configured to:
  use a wireless connection operating in a first operation mode (OM) associated with a first physical layer supporting a first data transmission rate;
  maintain a connection with a host device that executes an application;
  determine, in view of the application, one or more application-specific parameters of an OM utility function;
  obtain a first plurality of metrics characterizing quality of the wireless connection operating in the first OM and a second plurality of metrics predicting quality of the wireless connection in a second OM associated with a second physical layer supporting a second data transmission rate;
  identify a difference between a second utility value and a first utility value, wherein the first utility value is determined by applying the OM utility function to the first plurality of metrics and the second utility value is determined by applying the OM utility function to the second plurality of metrics; and
  initiate a change of the wireless connection from operating in the first OM to operating in the second OM based on the identified difference.

18. The system of claim 17, wherein each of the first OM and the second OM is one of a 1 Mbps LE operation mode, a 2 Mbps LE operation mode, a 500 kbps S2 LE Coded operation mode, or a 125 kbps LE Coded S8 operation mode.

19. The system of claim 17, wherein the first plurality of metrics comprises at least one of:
  a throughput of the wireless connection operating in the first OM,
  a representation of a signal strength of the wireless connection operating in the first OM, a packet loss rate of the wireless connection operating in the first OM,
  a transmission latency time of the wireless connection operating in the first OM, or a packet retransmission rate of the wireless connection operating in the first OM, and
  wherein to obtain the first plurality of metrics, the wireless controller is configured to determine at least one of:
    a received signal strength indicator (RSSI) of the wireless connection operating in the first OM, or
    a signal-to-noise ratio (SNR) of the wireless connection operating in the first OM.

20. The system of claim 17, wherein the wireless controller is further configured to:
  update the second plurality of metrics, using one or more measurements of the quality of the wireless connection operating in the second OM;
  obtain a third plurality of metrics predicting quality of the wireless connection operating in a third OM associated with a third data transmission rate;
  identify a difference between a third utility value and an updated second utility value, wherein the third utility value is obtained by applying the OM utility function of the third plurality of metrics and the updated second utility value is obtained by applying the OM utility function to the updated second plurality of metrics; and
  initiate a change of the wireless connection from operating in the second OM to operating in the third OM based on the identified difference between a third utility value and an updated second utility value.

\* \* \* \* \*